United States Patent [19]

Baugh

[11] Patent Number: 4,824,074

[45] Date of Patent: Apr. 25, 1989

[54] BI-DIRECTIONAL GATE VALVE

[76] Inventor: Benton F. Baugh, 14626 Oak Bend, Houston, Tex. 77079

[21] Appl. No.: 844,884

[22] Filed: Mar. 27, 1986

Related U.S. Application Data

[63] Continuation of Ser. No. 579,698, Feb. 13, 1984, abandoned.

[51] Int. Cl.⁴ ............................................. F16K 3/16
[52] U.S. Cl. .................................. 251/172; 251/175; 251/328
[58] Field of Search .............. 251/327, 328, 171, 172, 251/175

[56] References Cited

U.S. PATENT DOCUMENTS

| | | | |
|---|---|---|---|
| 2,318,575 | 5/1943 | Armington et al. | 277/188 X |
| 3,135,284 | 6/1964 | Magos | 251/327 X |
| 4,363,465 | 12/1982 | Morrill | 251/328 X |
| 4,428,561 | 1/1984 | Thompson | 251/171 X |

FOREIGN PATENT DOCUMENTS 844877  7/1981  U.S.S.R.

Primary Examiner—Arnold Rosenthal

[57] ABSTRACT

A gate valve improvement including a seat-to-body seal means for reliable bi-directional sealing, a port to bypass at least one of the seat-to-body seals, and means to plug the bypass port when the operation of this seal is desired.

9 Claims, 2 Drawing Sheets

4,824,074

BI-DIRECTIONAL GATE VALVE

This Application is a continuation of Ser. No. 06/579,698 filed Feb. 13, 1984, and now abandoned.

BACKGROUND OF THE INVENTION

This invention relates to gate valve construction and more particularly to the effectiveness and redundancy of sealing between the gate and seat members of the gate valve.

Prior art gate valves involve typically two seats separated by a gate in which the downstream seat is considered to be the reliable seal, and an unpredictable sealing characteristic is associated with the upstream seat. When upstream pressure in increased on these valves, a portion of fluid must pass across critical gate-to-seat or seat-to-body seal surfaces to pressurize the valve body cavity or chamber.

On valves with a rising stem, this fluid must be expelled across these same surfaces when opening the valve or high pressure is built up in the body cavity. This high body pressure is not only potentially damaging to the valve itself, but also makes the valve more difficult to operate.

Additionally, although there are two seats contacts the gate, there is little or no recourse to save the valve if either seat starts to leak.

Typical prior art patents of which illustrate the problem are shown in U.S. Pat. No. 3,768,774, U.S. Pat. No. 4,201,238, U.S. Pat. No. 3,026,084, U.S. Pat. No. 3,006,559, U.S. Pat. No., 3,696,831, and U.S. Pat. No. 4,281,819.

SUMMARY OF THE INVENTION

The present invention involves a gate valve with dual seats in which each of the seats is provided with highly reliable bi-directional type seal. The first seal is provided with a bypass port in which the pressure differential and wear is eliminated during the initial life of the valve. Upon failure for whatever reason of the second seat or seat seal, the bypass port can be plugged, thereby allowing the second seat to hold the pressure differential to be imposed across the valve. By plugging this bypass port, a second life of the valve is started during which the maintenance and or repair of the valve can be scheduled at the convenience of the personnel in charge. In some cases in the oilfield, it is anticipated that this double valve capability will allow this unit to replace the requirement for two separate redundant valves to be purchased and installed.

DESCRIPTION OF THE DRAWINGS

This invention will be better understood in connection with the following description when taken in connection with the drawings in which.

DESCRIPTION OF THE PREFERRED EMBODIMENT

Figure 1:
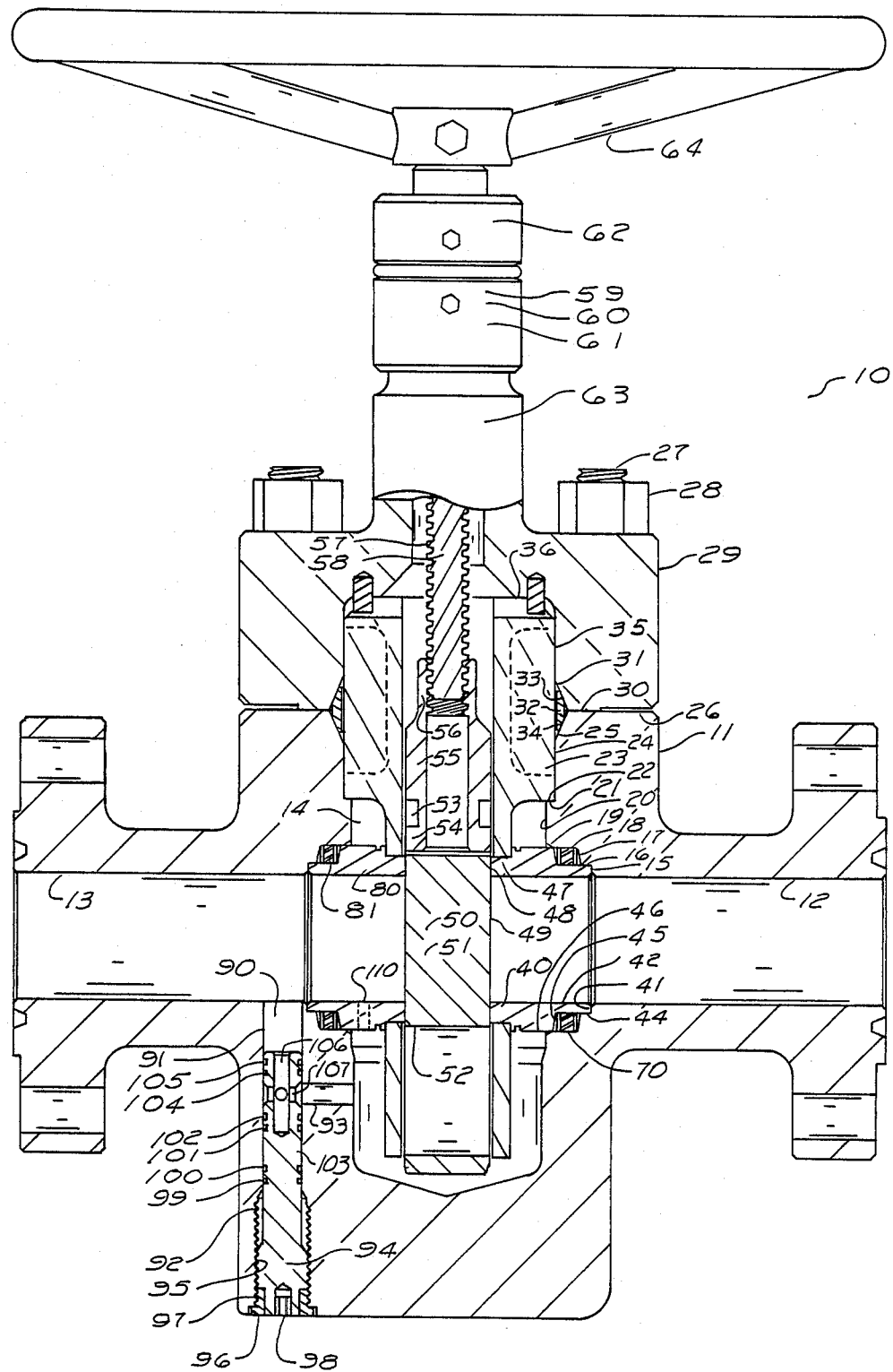
FIG. 1 is a sectional view taken through the gate valve of this invention with the gate in the closed position and the plug in the open position.

Referring now to the drawings,

In FIG. 1, the gate valve assembly 10 includes a valve body 11 having a pair of aligned cylindrical flow passages 12 and 13 which respectively open to an enlarged valve chamber 14 in the valve body 11. Flow passages 12 and 13 on their outer ends terminate in an API type flange, which is well known in the trade.

Flow passage 12 terminates at its inner end with flat surface or shoulder 15 which extends out radially to a counterbore 16, which intersects conical surface 17, which moves radially outwardly to a second counterbore 10. The counterbore 18 has a chamfer surface 19 which intersects the cylindrical surface 20 of valve chamber 14.

Cylindrical surface 20 extends upwardly to annular shoulder 21, which receives and positions corresponding shoulder 22 of the gate retainer 23. The annular shoulder 21 terminates at the intersection of cylindrical surface 24. An upwardly and outwardly tapered seal surface 25 extends to the intersection with surface 26, which is the top of valve body 11. Studs 27 are threaded into the top surface 26 of valve body 11 in a manner not shown, but well known in the trade. Nuts 28 are threaded onto the studs 27 to secure the bonnet 29 against the valve body 11.

Bonnet 29 has an annular shoulder 30 which surrounds the bore 35. A tapered seal surface 31, which has a smoothness of 32 RMS, extends upwardly and inwardly at an angle of approximately 23 degrees to intersect the bore 35.

Seal ring 32 has a surface 33 which sealingly engages seal surface 31 and a surface 34 which sealingly engages seal surface 25. The surface 36 forms the top of the valve cavity 14.

Seat 40 composes a cylindrical body including an outer end 41 which butts surface 15 of the valve body and an internal bore 42 which approximately matches the bore 12 in the valve body. The outer diameter 44 receives a seat packer 70 as will be described in detail later. The cylindrical surface 44 intersects tapered surface or shoulder 45 which extends out radially to the larger diameter surface 46. The cylindrical body has a reduced diameter portion 47 adjacent large diameter surface 46 received in gate retainer 23 for retention of the cylindrical body during assembly.

Surface 48 on seat 40 sealingly engages surface 49 on gate 50 to prevent the flow of fluid through the valve. Each of these surfaces is prepared to a smoothness as measured by four RMS and a flatness as measured by two light bands. Each of these measurements are well known in the trade.

Gate 50 has a solid portion 51 which blocks the flow through the valve when aligned in front of seat 40 and has a bore 52 through the gate which permits flow through the valve when it is aligned in front of seat 40. The top of gate 50 has a T-slot section 53 which engages the T-slot section 54 of the rising stem section 55. Rising stem section 55 also has a threaded section 56 which engages the male thread 57 on stem 58.

Stem 58 is connected by shear pin 59 to load ring 60 and thereby transmits loadings into bearings 61 and 62 at various times in operation of the valve. Stem seals 63 seal the stem against pressure, and handwheel 64 is provided to operate the valve.

Figure 2:
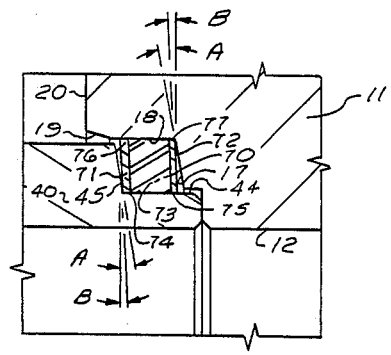
FIG. 2 is an enlarged view of the seat-to-body seal and associated area.

Referring now to FIG. 2, seat packer 70 is a composite of two metal plates 71 and 72 and a resilient seal element 73. Metal plates 71 and 72 are preferably machined as flat plates for ease of machining a reversibility of installation. Surfaces 17 and 45 are machined at angles "A" from vertical and movement of seat 40 into position causes surface 45 to impact the lower portion of metal ring 71 while surface 17 impacts the upper portion of metal ring 72. Continued movement of the seat into final position causes the rings to flex to an angle with vertical of "B" which is equal to or less than angle "A". This loading of rings 71 and 72 causes them to act as "Belleville" springs with the load of the spring force acting upon the resilient member 73 between them, causing the resilient element 73 to seal against surfaces 18 and 44.

Surfaces 74 and 75 are manufactured sufficiently close to the diameter of surface 44 to prevent extrusion of the resilient member 73. In like manner surfaces 76 and 77 are manufactured sufficiently close to the diameter of surface 18 to prevent extrusion of resilient member 73.

In critical applications, these surfaces can be machined with an interference fit to promote long seal life. In some applications, it may be desired to leave the resilient material 73 out of the assembly and rely solely on the metal interference seals.

Referring again to FIG. 1, seat 80 and seat packet 81 perform in a similar fashion to seat 40 and seat packet 70. Each of these seats and seat packer combinations are capable of sealing in either direction.

Port 90 is provided to cause a flow path around the seat 80 and seat packer 81 to allow fluid flow from cylindrical flow passage 13 into valve chamber 14. This port, as long as it is open, renders the seat 80 and seat 81 completely ineffective with regards to holding pressure. This in effect causes all pressure differentials across this valve to be taken across seat 40 and seat packer 70. As seat 40 and seat packer 70 are bi-directional, they are capable of handling this task as long as they have a useful life.

If seat 40 and seat packer 70 will no longer hold pressure for any reason, the port 90 is to be plugged, thereby enabling seat 80 and seat packer 81 to seal of the fluid flow and differential of the valve.

Port 90 has a first bore 91 which extends from bore 13 to a threaded portion 92. Intermediate to bore 13 and threaded portion 92 a second smaller bore 93 intersects bore 92 and causes it to communicate with valve chamber 14.

Plug 94 is shown in port 90 in a position in which the flow through port 90 is not obstructed. Threads 95 of plug 94 are shown engaged in threads 92 of the port 90 with the plug 94 being in engagement with stop nut 96. Threads 97 on stop nut 96 also engage threads 92. Hex profile 98 on the lower end of plug 94 provide a method of engaging a wrench to rotate and thereby move the plug 94.

Three sets of seals are provided on plug 94. Each of the seals are of the O-ring type in conventional O-ring grooves. Seals 99 and 100 provide redundant seals to prevent the flow of fluids out of the valve. Seals 101 and 102 will pass across the port 93 and thereby block the port with the solid portion 103 of plug 94. Seals 104 and 105 serve only to protect from corrosion the seal area of bore 91 in which seals 101 and 102 will seal against after the plug is actuated. Ports 106 and 107 provide fluid passage past the seals 104 and 105.

Figure 3:
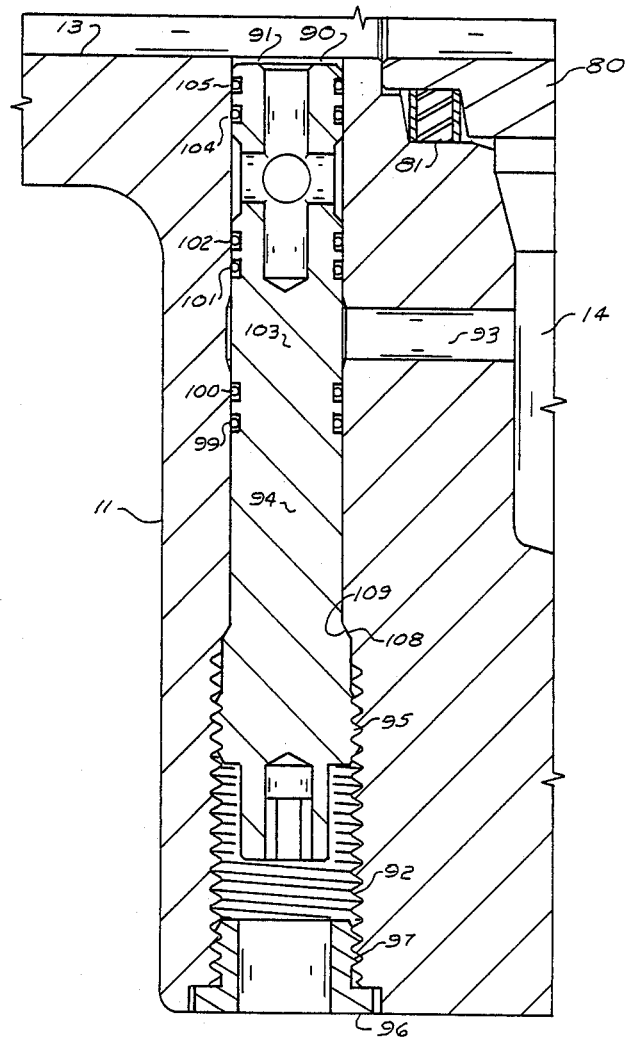
FIG. 3 is a view of the plug in the closed position.

Referring now to FIG. 3; the plug 94 is shown actuated into the upper position, moving forward until shoulder 108 on plug 94 strikes shoulder 109 on port 90. Seals 101 and 102 have been moved to position formerly occupied by seals 104 and 105, and seals 99 and 100 have been moved forward to the position formerly occupied by seals 101 and 102. The solid portion 103 of plug 94 is now blocking the flow through the port 90, thereby causing the seat 80 and seat packer 81 to be an operational sealing unit.

Referring again to FIG. 1, at point 110 on seat 80, it can readily be seen that if a hole is drilled through the seat at this point, some of the advantages of this invention can be derived, without the expense of installing the plug 94 in a port such as port 90. This will allow full use of the bi-directional capabilities of seat 40 and seat packer 70, eliminates flushing fluid across the critical seal surfaces, and prevent pressure locking the body of the valve by movement of a rising stem. If this is planned in the production operations, the expense of the seat packer and the receiving area for the seat packer can be completely eliminated.

It will be apparent to those skilled in the art that various changes may be made in the invention without departing from the spirit and scope thereof and therefore the invention is not limited by that which is enclosed in the drawings and specifications but only as indicated in the appended claims.

I claim:

1. A valve comprising:
   a valve body having an inlet and an outlet with a chamber therebetween;
   one or more seats means located within said chamber in said body;
   a gate means with a hole therethrough located within said chamber within said body for cooperating with said one or more seats means for preventing fluid flow in the closed position when said hole is not aligned with said one or more seats means and for permitting fluid flow in the open position when said hole is aligned with said one or more seats means;
   sealing means with a resilient non-metal portion between said valve body and said one or more seats means, adapted to be axially compressed by insertion of the gate means between the seats means which axially moves the seats means relative to said body, said sealing means with a resilient non-metal portion being fluidly pressured by the movement of the seat means along the valve body centerline between the inlet and the outlet such that the fluid type pressure in the sealing means with a resilient non-metal portion causes improved sealing engagement with an internal diameter within said chamber in said body and improved sealing engagement with an external diameter on said one or more seat means.

2. The invention of claim 1, wherein said sealing means with a resilient non-metal portion is a composite of two metal rings axially separated by a resilient non-metal member.

3. The invention of claim 1, wherein said sealing means is a metal ring.

4. The invention of claim 1, wherein said flow means between said seat and said closure member and said seal means between said seat and said valve body prevent the flow of fluid from the inlet of said valve body and alternately prevents the flow of fluid from said outlet of said valve body.

5. The invention of claim 2, wherein said metal ring adjacent to and axially loaded by said body is loaded about the outer diametrical portion by said body and resiliently and conically deflected by axial movement of the seat relative to the body and said metal ring adjacent to said seat means is loaded about the inner diametrical portion by said seat means and resiliently and conically deflected by axial movement of the seat means relative to said body to provide a resilient preload on said resilient non-metal member which improves the sealing engagement of the non-metal member against said internal diameter on said body and said external diameter on said seat means.

6. A valve comprising:

A valve assembly comprising a valve body having an inlet and an outlet with a chamber therebetween; said chamber containing a gate, a first seat, and a second seat; a port communicating said inlet with said chamber; and a plug for said port to selectively allow or prevent flow thru said port;

said first seat means and said second seat means in said chamber in said valve body sealingly engaging said valve body;

said gate means in said chamber in said valve body with a hole therethrough for sealingly engaging and cooperating with said seat means for preventing fluid flow from said inlet into said chamber and from said chamber into said outlet in the closed position when said hole is not aligned with said seat means and for permitting fluid flow from said inlet into said chamber and from said chamber into said outlet in the open position when said hole is aligned with said seat means;

said first seat means positioned between said inlet and said gate means;

said second seat means positioned between said outlet and said gate means; and a port fluidly connecting said chamber containing said first seat, second seat, and gate with said inlet to bypass said first seat means and said gate means and allow fluid flow from said inlet to said chamber when said gate means is in said closed position, such that when said gate is in said closed position and fluid flow comes from said inlet, said gate and said second seat cooperate for preventing flow from said inlet to said outlet, such that when said gate is in said closed position and fluid flow comes from said outlet, said gate and said second seat cooperate for preventing flow from said outlet to said inlet, such that when said gate is in said closed position said gate and said first seat are prevented from cooperating to prevent flow from said inlet to said outlet or from said outlet to said inlet because of said port fluidly bypassing said first seat and said gate, such that flow from said inlet to said outlet or from said outlet to said inlet when said gate is in said closed position will be an indication that the sealing surfaces between said gate and said second seat cannot cooperate to prevent said flow or that the sealing surfaces between said second seat and said body cannot cooperate to prevent said flow, and plug means for closing said port from flow from inlet into said chamber or from said chamber into said inlet such that when said gate is in said closed position said gate and said first seat are then able to cooperate to prevent flow from said inlet to said chamber or from said chamber to said inlet, and therefore from said inlet to said outlet or from said outlet to said inlet.

7. The invention of claim 6 comprising:

said plug means for closing said port and thereby permitting said first seat and said gate means to prevent fluid flow from said inlet to said chamber or from said chamber into said inlet in said closed position having a first position allowing flow thru said port and having a second position closing said port and preventing flow thru said port.

8. The invention of claim 6, wherein said port is in said valve body.

9. The invention of claim 7, comprising means for moving said plug from said first position permitting flow through said port to said second position preventing flow through said port thereby cooperating with said first seat means and said gate means to prevent flow from said inlet to said chamber or from said chamber to said inlet, said means for moving said plug comprising a female thread in said valve body, a male thread on said plug, and a profile which can be engaged by a wrench for rotation.

* * * * *